(12) United States Patent
Nakayama et al.

(10) Patent No.: US 11,410,707 B2
(45) Date of Patent: *Aug. 9, 2022

(54) SUSPENSION FOR DISK DEVICE

(71) Applicant: NHK SPRING CO., LTD., Yokohama (JP)

(72) Inventors: Hiroshi Nakayama, Yokohama (JP); Masao Hanya, Yokohama (JP); Tatsuhiko Nishida, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,149

(22) Filed: Sep. 27, 2021

(65) Prior Publication Data

US 2022/0013150 A1    Jan. 13, 2022

Related U.S. Application Data

(63) Continuation of application No. 17/125,438, filed on Dec. 17, 2020, now Pat. No. 11,170,822.

(30) Foreign Application Priority Data

Jan. 31, 2020   (JP) .............................. JP2020-014682

(51) Int. Cl.
*G11B 5/48* (2006.01)
*G11B 33/02* (2006.01)
*G11B 33/08* (2006.01)
*G11B 5/55* (2006.01)

(52) U.S. Cl.
CPC ............ *G11B 33/022* (2013.01); *G11B 5/486* (2013.01); *G11B 5/4826* (2013.01); *G11B 5/4833* (2013.01); *G11B 5/5582* (2013.01); *G11B 33/08* (2013.01)

(58) Field of Classification Search
None
See application file for complete search history.

(56) References Cited

U.S. PATENT DOCUMENTS

| 5,473,487 | A | 12/1995 | Nagase |
| 5,530,606 | A | 6/1996 | Baasch et al. |
| 6,967,821 | B2 | 11/2005 | Himes et al. |
| 8,947,833 | B2 | 2/2015 | Hanya et al. |
| 9,042,056 | B2 | 5/2015 | Hanya et al. |
| 10,748,565 | B1 | 8/2020 | Nakayama et al. |
| 10,991,388 | B1 | 4/2021 | Yamada |
| 11,170,822 | B2 * | 11/2021 | Nakayama ........... G11B 33/022 |

(Continued)

FOREIGN PATENT DOCUMENTS

JP        2010086630 A     4/2010

*Primary Examiner* — William J Klimowicz
(74) *Attorney, Agent, or Firm* — Holtz, Holtz & Volek PC (57) ABSTRACT

A suspension includes a load beam with first and second openings, a flexure including first and second outriggers, and first and second damper members. The first damper member is attached to the load beam and part of the first outrigger that overlaps the first opening of the load beam. The second damper member is attached to the load beam and part of the second outrigger that overlaps the second opening of the load beam. The first opening includes a region which is not covered by the first damper member, and the second opening includes a region which is not covered by the second damper member.

9 Claims, 9 Drawing Sheets

(56) References Cited

U.S. PATENT DOCUMENTS

| | | | |
|---|---|---|---|
| 2006/0227464 A1* | 10/2006 | Huang ................ | G11B 5/4826 |
| 2008/0144223 A1* | 6/2008 | Muraki ................ | G11B 5/4853 |
| | | | 360/244.8 |
| 2010/0079915 A1 | 4/2010 | Kido | |
| 2021/0280209 A1* | 9/2021 | Suzuki ................ | G11B 5/4853 |
| 2021/0287698 A1* | 9/2021 | Yamada ................ | G11B 5/5582 |

\* cited by examiner

SUSPENSION FOR DISK DEVICE

CROSS-REFERENCE TO RELATED APPLICATIONS

This application is a Continuation Application of U.S. application Ser. No. 17/125,438, filed Dec. 17, 2020, which is based upon and claims the benefit of priority from Japanese Patent Application No. 2020-014682, filed Jan. 31, 2020, the entire contents of both of which are incorporated by reference herein.

BACKGROUND OF THE INVENTION

1. Field of the Invention

The present invention relates to a suspension for a disk device used for hard disk drives or the like.

2. Description of the Related Art

Hard disk drives (HDDs) are used in data processors such as personal computers and the like. The hard disk drives include a magnetic disk rotating around a spindle, a carriage pivoting around a pivot shaft and the like. The carriage includes an actuator arm and pivots around the pivot shaft in a width direction of a track of the disk by a positioning motor such as a voice coil motor.

A disk drive suspension (simply referred to as a suspension hereinafter) is attached to the actuator arm. The suspension includes a load beam and a flexure overlaid on the load beam and the like. At gimbal portion formed near a distal portion of the flexure, a slider which constitutes a magnetic head is provided. On the slider, an element (transducer) is provided for carrying out access such as read or write of data and the like. The load beams, the flexure, the slider and the like constitute a head gimbal assembly.

The gimbal portion includes a tongue on which the slider is mounted and a pair of outriggers formed on respective sides of the tongue. The outriggers have such a shape that stretches out to respective sides of the flexure. Both longitudinal end portions of each outrigger are fixed to the load beam by, for example, laser welding or the like. Each outrigger can flex like a spring in a thickness direction and serves an important role to secure the gimbal movement of the tongue.

In order to be provided for high recording density of disks, it is necessary to further the head gimbal assembly and to become able to position the slider to a record surface of a disk at higher precision. In order to achieve this, shaking of the flexure needs to be suppressed as much as possible while securing the gimbal movement required by the head gimbal assembly. For example, as disclosed in U.S. Pat. No. 6,967,821 B and JP 2010-086630 A, it is also known that a damper member is provided on a part of the suspension so as to suppress the shaking of the flexure.

In order to lessen the shaking of the flexure caused when a vibration is applied, it is, in some cases, effective to restrain the shaking of an outrigger. Therefore, there has been a proposal of providing a damper member on the outrigger itself. In other words, a damper member is attached to the outrigger so that the outrigger and the damper member move together. However, if a damper member is attached to an outrigger, there arises a problem that the rigidity of the flexure is increased though the shaking of the flexure can be restrained. For example, a flexure in which a damper member extending along the longitudinal direction of the outrigger is attached to the outrigger is not preferable for gimbal movement because the rigidity in a pitch direction and the rigidity in a roll direction are increased as compared to a flexure without a damper member.

BRIEF SUMMARY OF THE INVENTION

An object of the present invention is to provide a suspension for a disk device which can effectively suppress the shaking of the flexure and also can suppress the rigidity of the flexure from increasing.

According to one embodiment, a suspension for a disk device comprises a load beam, a flexure, a first damper member and a second damper member. The load beam comprises a first surface, a second surface on an opposite side to the first surface, a first opening and a second opening, which penetrate from the first surface to the second surface. The flexure comprises a first outrigger formed across the first opening from a proximal end side to a distal end side of the load beam, at least a part of the first outrigger opposing the first surface, a second outrigger formed across the second opening from the proximal end side to the distal end side, at least a part of the second outrigger opposing the first surface, and a tongue disposed between the first outrigger and the second outrigger, on which a slider is mounted. The first damper member is attached to a part of the first outrigger and the first surface, and the part of the first outrigger overlaps the first opening. The second damper member is attached to a part of the second outrigger and the first surface, and the part of the second outrigger overlaps the second opening. An edge portion of the distal end side of the first opening and the first damper member are spaced apart from each other along a longitudinal direction of the load beam. An edge portion of the distal end side of the second opening and the second damper member are spaced apart from each other along the longitudinal direction.

Along a thickness direction of the load beam, gaps may be formed respectively between the edge portion of the distal end side of the first opening and the first outrigger and between the edge portion of the distal end side of the second opening and the second outriggers.

An edge portion of the proximal end side of the first opening and the first damper member may be spaced apart from each other along the longitudinal direction, and an edge portion of the proximal end side of the second opening and the second damper member may be spaced apart from each other along the longitudinal direction.

The first damper member may overlap the edge portion of the proximal end side of the first opening, and the second damper member may overlap the edge portion of the proximal end side of the second opening.

The edge portion of the proximal end side of the first opening and the first outrigger may be in contact with each other, and the edge portion of the proximal end side of the second opening and the second outrigger may be in contact with each other.

The first damper member and the second damper member may be spaced apart from each other in a width direction of the load beam. In this case, the flexure may further comprise a wiring portion passed through between the first damper member and the second damper member to be connected to the slider.

The first outrigger may include a first bent portion overlapping the first opening, and the second outrigger may include a second bent portion overlapping the second opening. In this case, the first damper member may be attached to the first bent portion, and the second damper members may be attached to the second bent portion.

The load beam may include a first projecting portion projecting towards the first bent portion in the first opening and a second projecting portion projecting towards the second bent portion in the second opening. In this case, the first damper member may be attached to the first projecting portion, and the second damper member may be attached to the second projecting portion.

An area where the first damper member and the first outrigger overlap each other in the distal end side with respect to a center of the first bent portion may be greater than an area where the first damper member and the first outrigger overlap each other in the proximal end side with respect to the center. Further, an area where the second damper member and the second outrigger overlap each other in the distal end side with respect to a center of the second bent portion may be greater than an area where the second damper member and the second outrigger overlap each other in the proximal end side with respect to the center.

According to the suspension for a disk device of such a configuration, the swing of the flexure including a tongue and a pair of outriggers can be inhibited effectively. Further, it is possible to inhibit the rigidity of the flexure from increasing, and therefore an adverse effect on the gimbal movement can be avoided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Various embodiments will be described hereinafter with reference to the accompanying drawings.

First Embodiment

Figure 1:
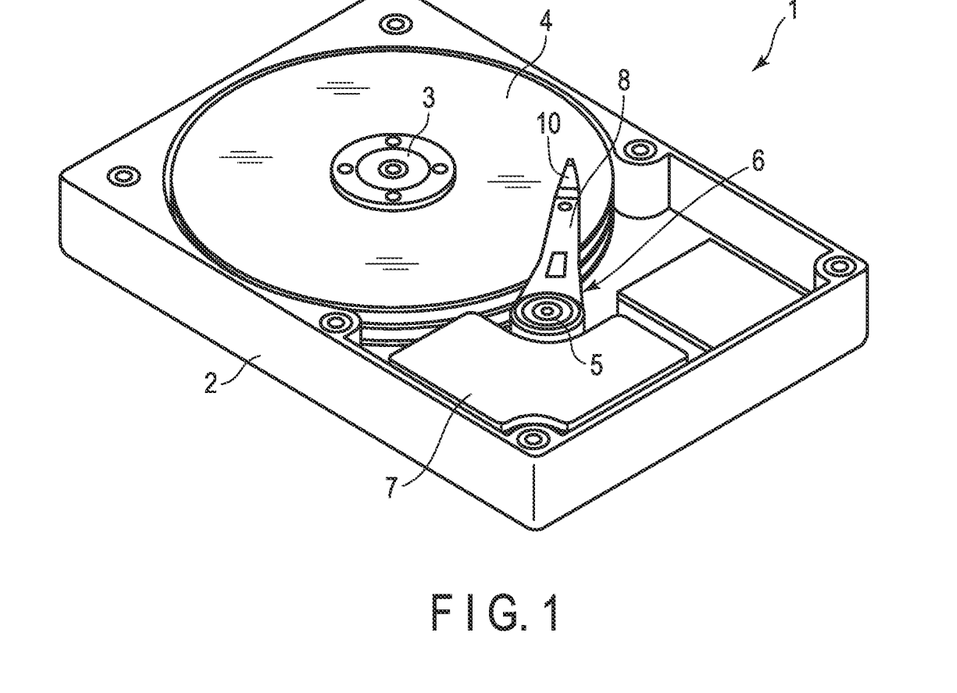
FIG. 1 is a schematic perspective diagram showing an example of a disk device.

FIG. 1 is a schematic perspective diagram showing an example of a disk device (HDD) 1. The disk device 1 comprises a case 2, a plurality of disks 4 rotating around a spindle 3 at center, a carriage 6 pivotable around a pivot shaft 5 at center, and a positioning motor (a voice coil motor) 7 for driving the carriage 6. The case 2 is sealed by a lid (not shown).

Figure 2:
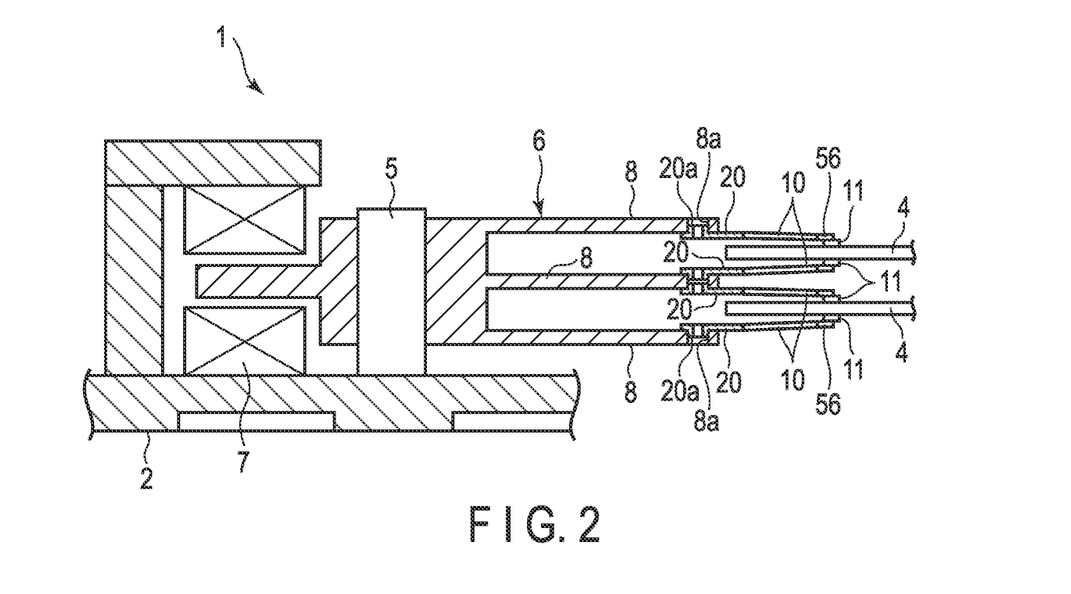
FIG. 2 is a schematic cross-sectional view of the disk device shown in FIG. 1.

FIG. 2 is a schematic cross-sectional view showing a part of the disk device 1. As shown in FIGS. 1 and 2, the carriage 6 is provided with a plurality of arms (carriage arms) 8. At a distal end portion of each arm 8, a suspension 10 is attached. At a distal end portion of each suspension 10, a slider 11, which constitutes a magnetic head, is provided. As a disk 4 rotate at high speed, air flows in between the disk 4 and the slider 11, thereby forming an air bearing.

When the carriage 6 is pivoted by the positioning motor 7, the suspension 10 moves along a diametrical direction of the disk 4 and thus the slider 11 moves to a desired track of the disk 4.

Figure 3:
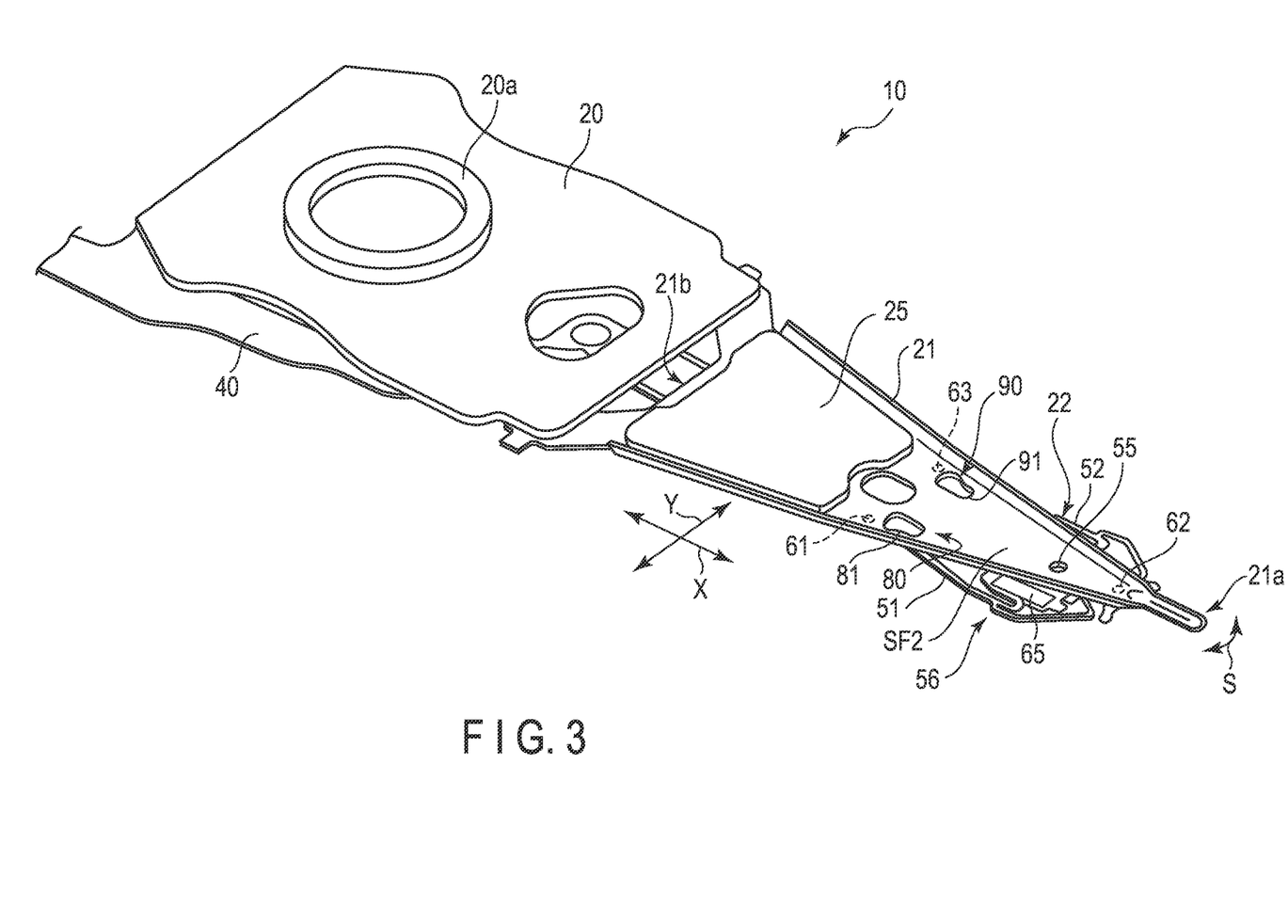
FIG. 3 is a schematic perspective diagram of a suspension for a disk device according to the first embodiment.
Figure 4:
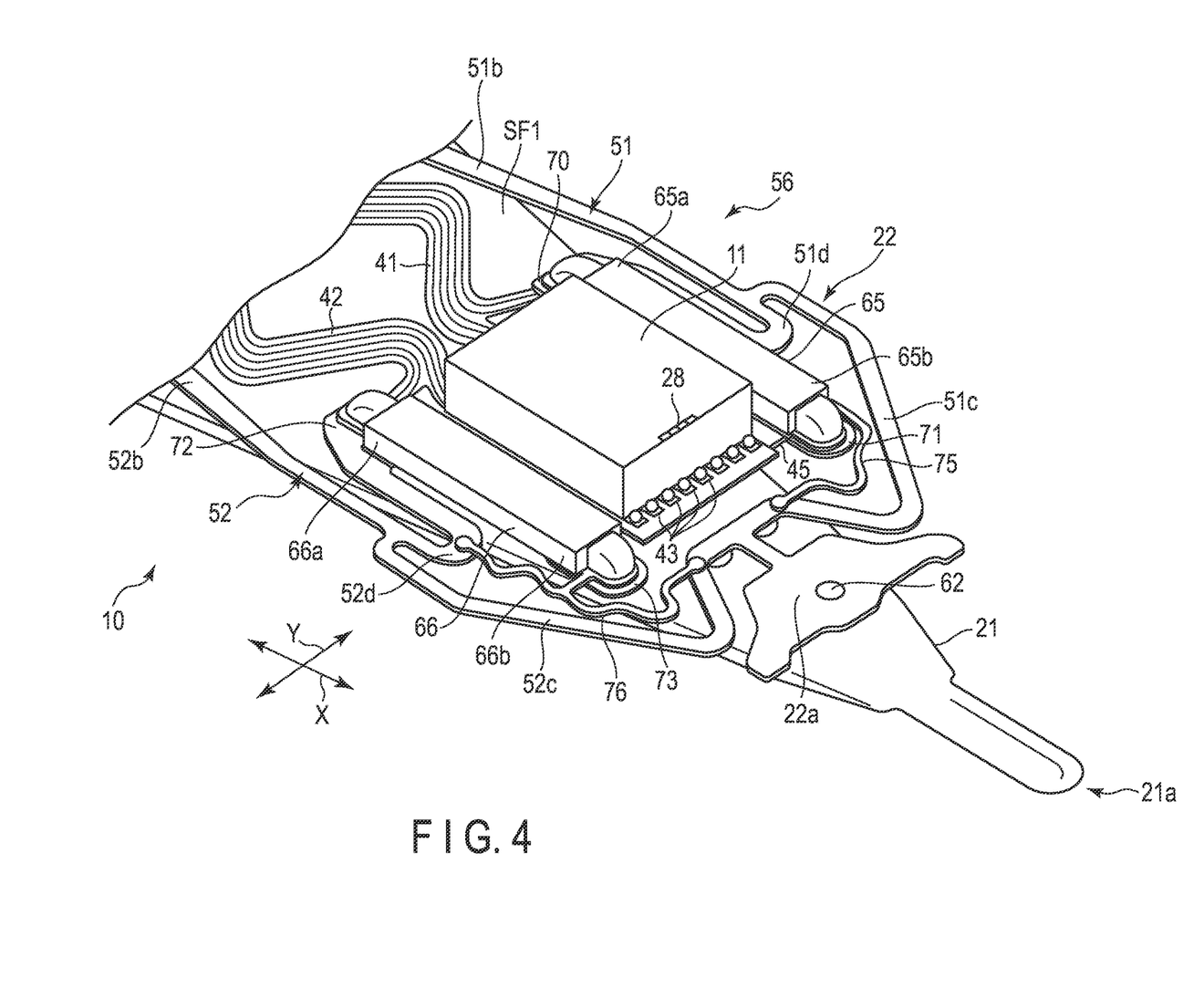
FIG. 4 is a schematic perspective diagram of the suspension shown in FIG. 3 as viewed from a slider side.

FIG. 3 is a schematic perspective diagram of the suspension 10 according to this embodiment as viewed from an opposite side to the slider 11. FIG. 4 is a schematic perspective diagram of a part on a distal portion side of the suspension 10 as viewed from a slider 11 side.

The suspension 10 comprises a base plate 20 fixed to the respective arm 8 (see FIGS. 1 and 2) of the carriage 6, a load beam 21 and a flexure 22. In the base plate 20, a boss member 20a is formed to be inserted to a hole 8a (see FIG. 2) formed in the arm 8.

As shown in FIG. 3, the load beam 21 includes a distal end portion 21a and a proximal end portion 21b. In the example of the FIG. 3, the load beam 21 has a shape tapered down from the proximal end portion 21b to the distal end portion 21a. The flexure 22 is placed along the load beam 21.

In this embodiment, a direction from the proximal end portion 21b toward the distal end portion 21a (or an opposite direction) is defined as a longitudinal direction X of the suspension 10, the load beam 21, the flexure 22 and the like. Further, a direction normal to the longitudinal direction X is defined as a width direction Y of the suspension 10, the load beam 21 the flexure 22 and the like. Furthermore, swaying directions S are defined as indicated by arc-like arrows provided near a distal portion of the load beam 21 in FIG. 3.

The load beam 21 comprises a first surface SF1 shown in FIG. 4 and a second surface SF2 on an opposite side to the first surface SF1, shown in FIG. 3. The first surface SF1 is a surface on a side where the flexure 22 is disposed. As shown in FIG. 3, a damper members 25 may be provided on the second surface SF2.

In the distal end portion of the slider 11, which constitutes the magnetic head, a plurality of elements 28 which can convert magnetic signals and electric signals into each other, for example, MR elements, are provided. The slider 11 carries out write of data to a disk 4 or read of data from the disk 4 by the elements 28. The slider 11, the load beam 21, the flexure 22 and the like constitute a head gimbal assembly.

As shown in FIG. 3, the flexure 22 comprises a metal base 40 made from a thin stainless steel plate. Further, as shown in FIG. 4, the flexure 22 comprises a first wiring portion 41 and a second wiring portion 42 disposed along the metal base 40 in a region overlapping the load beam 21. Parts of the wiring portions 41 and 42 are electrically connected to the elements 28 of the slider 11 via terminals 43 of the slider 11.

The thickness of the metal base 40 is less than the thickness of the load beam 21. The thickness of the metal base 40 should preferably be 12 to 25 μm, and it is, for example, 20 μm. The thickness of the load beam 21 is, for example, 30 μm.

The first wiring portion 41 and the second wiring portion 42 include an insulating layer formed on the metal base 40, a conductor layer formed on the insulating layer and a cover layer covering the conductor layer. For example, the insulating layer and the cover layer are formed of polyimide, and the conductor layer is formed of copper.

Figure 5:
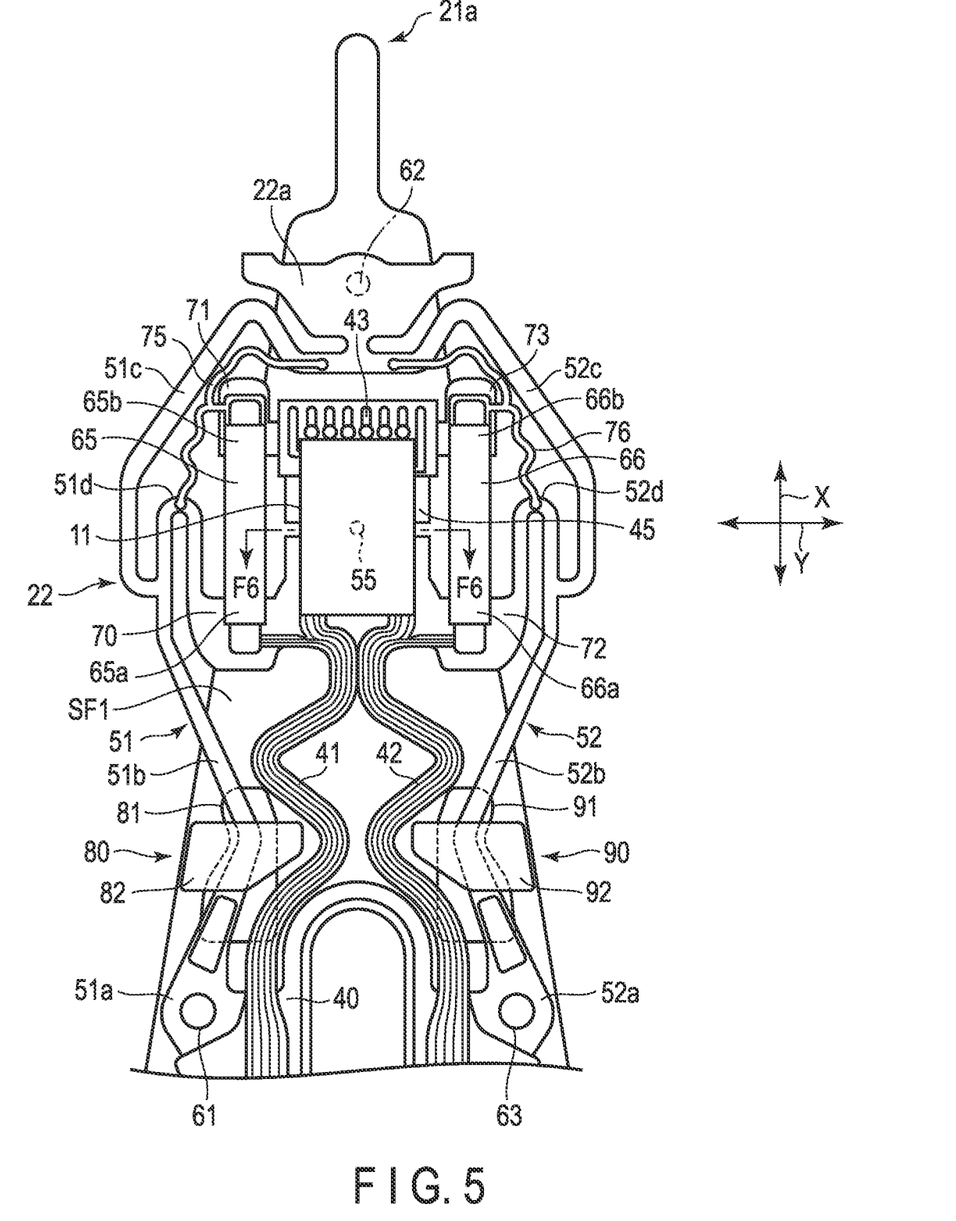
FIG. 5 is a schematic plan view of the suspension shown in FIG. 4.

FIG. 5 is a schematic plan view of a vicinity of the distal end portion of the suspension 10 as viewed from a slider 11 side. The flexure 22 includes a tongue 45, a first outrigger 51 and a second outrigger 52. On the tongue 45, the slider 11 is mounted. The first outrigger 51 and the second outrigger 52 are disposed in respective outer sides of the tongue 45 along the width direction Y.

The first outrigger 51 and the second outrigger 52 have such a shape as to protrude to respective outer sides of the tongue 45 along the width direction Y. The tongue 45, the first outrigger 51 and the second outrigger 52 are all parts of the metal base 40, and the outline of each of these is formed by, for example, etching.

Figure 6:
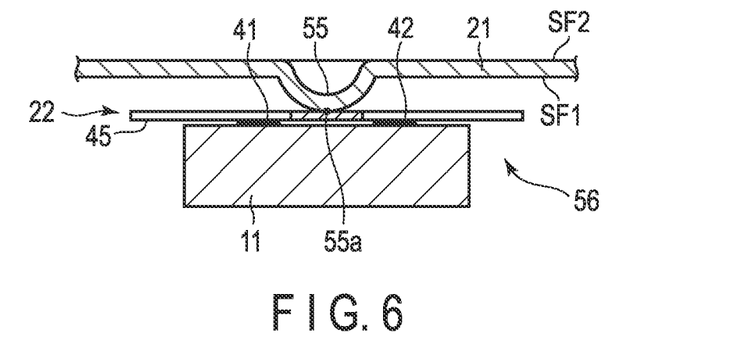
FIG. 6 is a schematic cross-sectional view of the suspension taken along line F6-F6 in FIG. 5.

FIG. 6 is a schematic cross-sectional view of the suspension 10 taken along line F6-F6 in FIG. 5. In the vicinity of the distal end portion 21a of the load beam 21, a dimple 55 projecting towards the tongue 45 is formed. A tip 55a of the dimple 55 is in contact with the tongue 45. The tongue 45 swings around the tip 55a of the dimple 55 to make a desired gimbal movement. The tongue 45, the first outrigger 51, the second outrigger 52, the dimple 55 and the like constitute a gimbal portion 56.

As shown in FIGS. 4 and 5, the first outrigger 51 extends entirely along the longitudinal direction X on one outer lateral side of the tongue 45. The second outrigger 52 extends entirely along the longitudinal direction X on the other outer lateral side of the tongue 45.

The first outrigger 51 includes a first proximal end portion 51a, a first proximal end arm 51b, a first distal end arm 51c and a first joint portion 51d. The first proximal end portion 51a is fixed to the load beam 21 by a fixing portion 61.

The first proximal end arm 51b extends from the first proximal end portion 51a towards the distal end portion 22a of the flexure 22. An end of the first distal end arm 51c is connected to the first proximal end arm 51b, and the other end is connected to the distal end portion 22a. The first joint portion 51d connects the one end of the first proximal end arm 51b and one side portion of the tongue 45 to each other. The distal end portion 22a is fixed near the distal end portion 21a of the load beam 21 by a fixing portion 62. The fixing portions 61 and 62 are formed by, for example, laser spot welding or the like.

The second outrigger 52 has a shape similar to that of the first outrigger 51. That is, the second outrigger 52 includes a second proximal end portion 52a, a second proximal end arm 52b, a second distal end arm 52c and a second joint portion 52d. The second proximal end portion 52a is fixed to the load beam 21 with a fixing portion 63, which is formed by, for example, by laser spot welding or the like.

As described above, both end portions of the first outrigger 51 along the longitudinal direction X are supported by the fixing portions 61 and 62, respectively. Further, both end portions of the second outrigger 52 along the longitudinal direction X are supported by the fixing portions 62 and 63. With this structure, a part of the first outrigger 51, which is located between the fixing portions 61 and 62, and a part of the second outrigger 52, located between the fixing portions 62 and 63 can flex along the thickness direction of the metal base 40. Thus, the tongue 45 is supported elastically by the first outrigger 51 and the second outrigger 52, and it can swing around the dimple 55 as a fulcrum.

On the gimbal portion 56, a first microactuator element 65 and a second microactuator element 66 are mounted. The microactuator elements 65 and 66 are each formed of a piezoelectric material, and are placed on respective sides of the slider 11. The both end portions 65a and 65b of the first microactuator element 65 are fixed respectively to actuator support members 70 of 71 of the tongue 45. The both end portions 66a and 66b of the second microactuator element 66 are fixed respectively to actuator support members 72 and 73 of the tongue 45.

The microactuator elements 65 and 66 have a function to pivot the tongue 45 in the swaying directions S (see FIG. 3). In the example shown in FIGS. 4 and 5, a limiter member 75 which suppresses excessive swing of the tongue 45 is provided between one side portion of the tongue 45 and the first outrigger 51. A limiter member 76 is also provided between the other side portion of the tongue 45 and the second outrigger 52.

As shown in FIG. 5, the suspension 10 of this embodiment comprises a first damping portion 80 and a second damping portion 90, which suppress the vibration of the flexure 22. The first damping portion 80 is provided in the vicinity of the first proximal end portion 51a of the first outrigger 51, and the second damping portion 90 is provided in the vicinity of the second proximal end portion 52a of the second outrigger 52.

Figure 7:
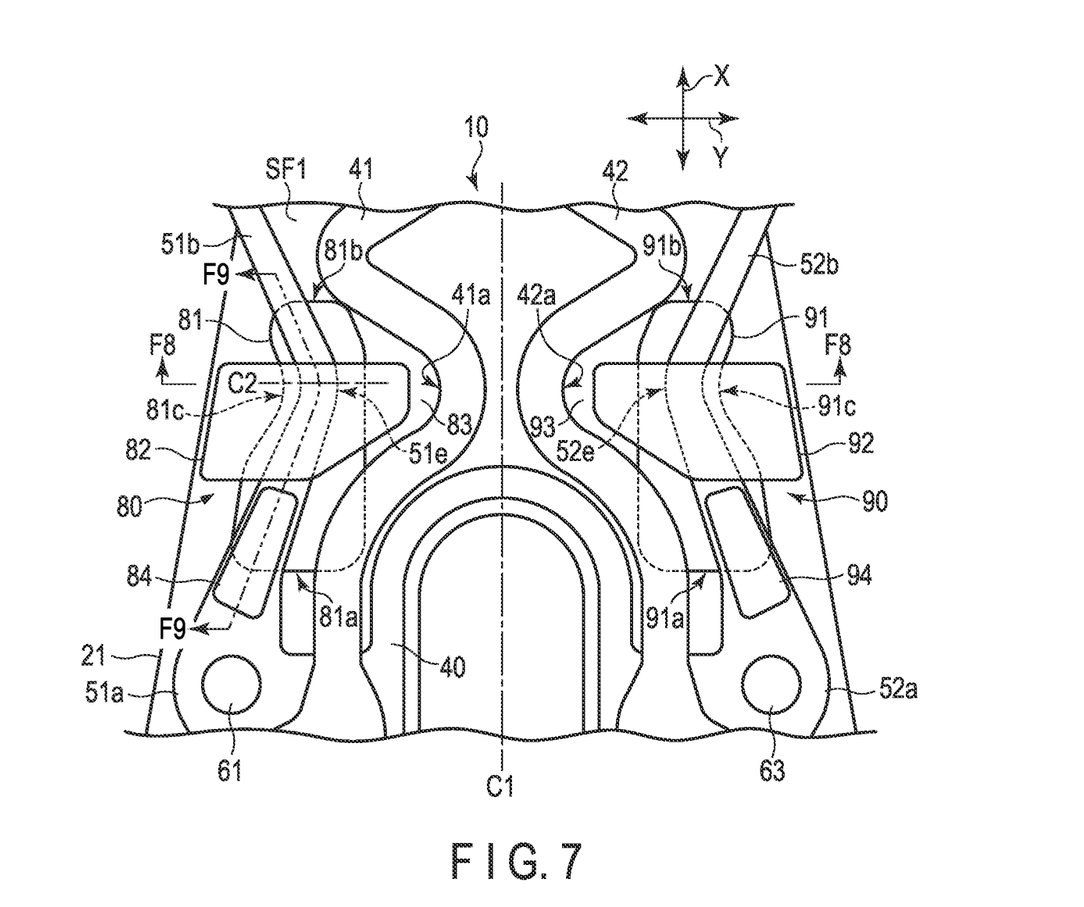
FIG. 7 is a plan view schematically showing structures of a first damping portion and a second damping portion of the suspension according to the first embodiment.

FIG. 7 is a schematic plan view showing a structure of the suspension 10 in the vicinities of the first damping portion 80 and the second damping portion 90. In the following description, a side where the distal end portion 21a of the load beam 21 shown in FIG. 3 is located may be referred to as a proximal end side, whereas a side where the proximal end portion 21b of the load beam 21 shown in FIG. 3 is located may be referred to as a distal end side.

As shown in FIG. 7, the load beam 21 comprises a first opening 81 in the vicinity of the first proximal end portion 51a. The first opening 81 has a proximal end side edge 81a and a distal end side edge 81b. A part of the first opening 81 is blocked by the first damper member 82. The first opening 81 and the first damper member 82 constitute the first damping portion 80.

The first proximal end arm 51b is located across the first opening 81 from the proximal end portion side to the distal end portion side. In other words, the first proximal end arm 51b overlaps the edge portions 81a and 81b. Further, the first proximal end arm 51b includes a first bent portion 51e in a position overlapping the first opening 81. In the proximal end portion with respect to the first bent portion 51e, the first proximal end arm 51b extends in a direction coming closer to a center C1 along the width direction Y. On the other hand, in the distal end side with respect to the first bent portion 51e, the first proximal end arm 51b extends in a direction going away from the center C1.

A part of the first wiring portion 41 overlaps the first opening 81. The first wiring portion 41 includes a first bent portion 41a in between the first opening 81 and the center C1. The first bent portion 41a is located by the first bent portion 51e of the first proximal end arm 51b along the width direction Y.

The first wiring portion 41 extends so as to decrease the distance between the center C1 and itself as it goes from the proximal end portion side towards the first bent portion 41a, and then extends so as to decrease the distance between the center C1 and itself as it goes from the first bent portion 41a towards the other bent portion of the distal portion side. With the first bent portion 41a thus provided, a space 83 on the first surface SF1 is formed between the first opening 81 and the first wiring portion 41.

The load beam 21 includes a first projecting portion 81c projecting towards the first bent portion 51e in the first opening 81. The first projecting portion 81c is spaced apart from the first proximal end arm 51b along the width direction Y. In the example shown in FIG. 7, an edge portion of the first projecting portion 81c has a curved shape. But the shape of the first projecting portion 81c is not limited to that of this example.

The first damper members 82 is attached to a part of the first proximal end arm 51b, which overlaps the first opening 81 and to the first surface SF1. In the example shown in FIG. 7, the first damper member 82 comes across the first opening 81 along the width direction Y. That is, along the longitudinal direction X, the edge portion 81a is spaced away from the first damper member 82, and the edge portion 81b is spaced away from the first damper member 82. Thus, in each of between the first damper member 82 and the edge portion 81b and between the first damper member 82 and the edge portion 81a, a region where the first opening 81 is not blocked by the first damper member 82 is formed.

The first damper member 82 is attached on a region of the first proximal end arm 51b, which includes the first bent portion 51e. Further, a part of the first damper member 82 is attached to the space 83, and some other part of the first damper member 82 is attached to a region on the first surface SF1, which includes the first projecting portion 81c. When the first projecting portion 81c overlaps the first damper member 82 in this way, a contact area between the first damper member 82 and the first surface SF1 is increased, and thus an attachment strength of the first damper member 82 is improved.

In the example shown in FIG. 7, a width of the part of the first damper member 82, which is on a center C1 side with respect to the first proximal end arm 51b along the longitudinal direction X is gradually decreased. With this structure, it is possible to prevent the first damper member 82 and the first wiring portion 41 from being brought into contact with each other.

Further, in the example shown in FIG. 7, the first damper member 82 is attached mainly to the proximal end portion of the first proximal end arm 51b rather than the first bent portion 51e. That is, as compared to an area where the first damper member 82 and the first proximal end arm 51b overlap in the distal end side with respect to a center C2 of the first bent portion 51e, an area where the first damper member 82 and the first proximal end arm 51b overlap in the proximal end side with respect to the center C2 is greater.

The second damping portion 90 has a structure similar to that of the first damping portion 80. That is, the second damping portion 90 includes a second opening 91 formed in the load beam 21 and a second damper member 92 blocking a part of the second opening 91.

The second proximal end arm 52b comes across the second opening 91 from the proximal end side to the distal end side, and overlaps a proximal end-side edge portion 91a of the second opening 91 and a distal end-side edge portion 91b. Further, the second proximal end arm 52b includes a second bent portion 52e in a position overlapping the second opening 91. The second wiring portion 42 incudes a second bent portion 42a in between the second opening 91 and the center C1, and with the second bent portion 42a, a space 93 on the first surface SF1 is formed between the second opening 91 and the second wiring portion 42. The load beam 21 includes a second projecting portion 91c projecting towards the second bent portion 52e of the second proximal end arm 52b in the second opening 91. The second damper member 92 overlaps the space 93 and the second projecting portion 91c.

In the example shown in FIG. 7, the second wiring portion 42, the second proximal end arm 52b, the second opening 91 and the second damper member 92 each has a line-symmetrical shape to the first wiring portion 41, the first proximal end arm 51b, the first opening 81 and the first damper member 82, respectively, with respect to the center C1.

As shown in FIG. 7, a first reinforcement portion 84 may be provided in the first proximal end arm 51b in the vicinity of the first proximal end portion 51a. Similarly, the second reinforcement portion 94 may be provided in the second proximal end arm 52b in the vicinity of the second proximal end portion 52a. The reinforcement portions 84 and 94 are parts with which a jig such as a shipping comb or the like is brought into contact, that is used to, for example, install the suspension 10 in a disk device, and they play a role to inhibit the damage of the structural members by the jig.

The reinforcement portions 84 and 94 have a multi-layered structure comprising an insulating layer, a conducting layer and a cover layer as in the case of, for example, the wiring portions 41 and 42. In the example shown in FIG. 7, the first reinforcement portion 84 overlaps the edge portion 81a of the first opening 81, but does not overlap the first damper member 82. Similarly, the second reinforcement portion 94 overlaps the edge portion 91a of the second opening 91, but does not overlap the second damper member 92.

Figure 8:
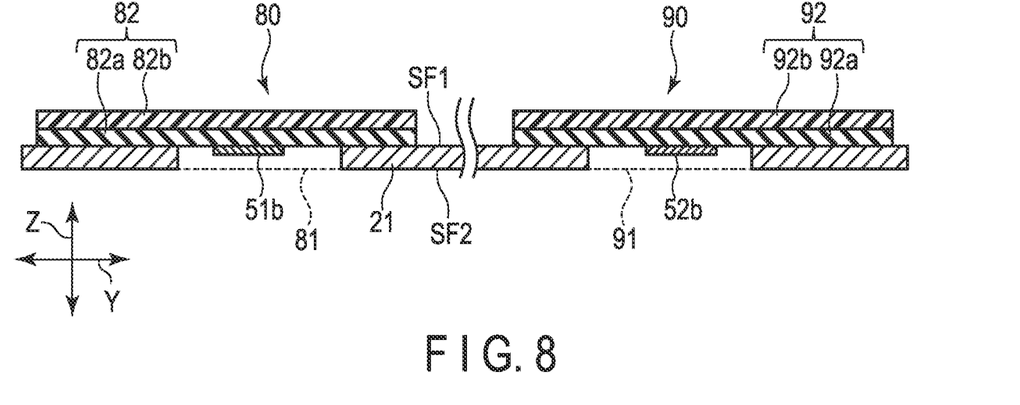
FIG. 8 is a schematic cross-sectional view of the first damping portion and the second damping portion taken along line F8-F8 in FIG. 7.
Figure 9:
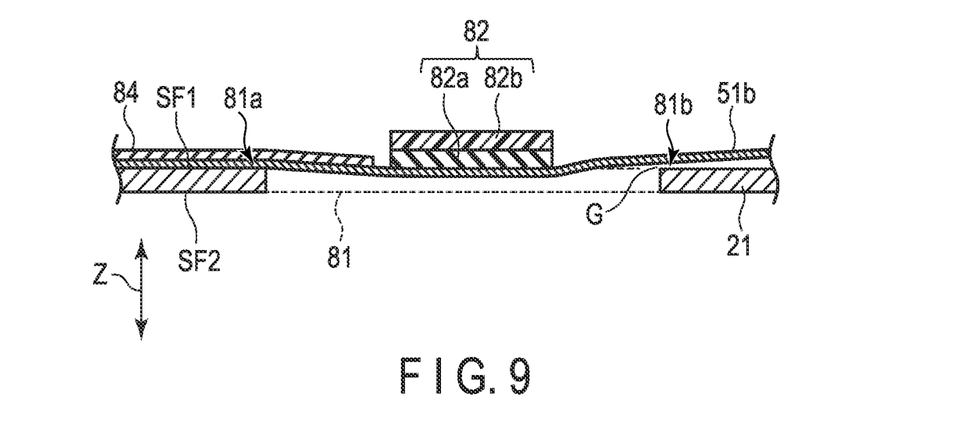
FIG. 9 is a schematic cross-sectional view of the first damping portion taken along line F9-F9 in FIG. 7.

FIG. 8 is a schematic cross-sectional view of the first damping portion 80 and the second damping portion 90 taken along line F8-F8 in FIG. 7. FIG. 9 is a schematic cross-sectional view of the first damping portion 80 taken along line F9-F9 in FIG. 7. As shown in FIG. 8, the first damper member 82 comprises a first surface SF1, a viscoelastic material layer 82a attaching to the first proximal end arm 51b and a constrained plate 82b. Similarly, the second damper member 92 comprises a first surface SF1, a viscoelastic material layer 92a sticking to the second proximal end arm 52b and a constrained plate 92b.

The viscoelastic material layers 82a and 92a are made from a high polymer material (for example, acrylic resin) which can exhibit viscous resistance, for example, when deformed and are adhesive. The thickness of the viscoelastic material layers 82a and 92a is, for example, 51 μm. The constrained plates 82*b* and 92*b* are formed from, for example, a synthetic resin such as polyester and they are stacked on the viscoelastic material layers 82*a* and 92*a*, respectively in the thickness direction Z of the load beam 21. The thickness of the constrained plates 82*b* and 92*b* is the same as that of, for example, the viscoelastic material layers 82*a* and 92*a* and it is 51 µm.

As shown in FIGS. 7 and 8, the first damper member 82 and the second damper member 92 are spaced away from each other along the width direction Y. Further, the wiring portions 41 and 42, discussed above are passed between the dampers members 82 and 92. With this structure, the wiring portions 41 and 42 are not restricted by the damper members 82 and 92, and therefore the increase in rigidity of the flexure 22 can be suppressed.

As shown in FIG. 9, the first proximal end arm 51*b* is pushed within the first opening 81 by the first damper member 82. The first proximal end arm 51*b* is inclined to gradually separate away from the load beam 21 in the distal end side (a right-hand side in the figure) with respect to the first damper member 82.

As described above, the first damper member 82 does not overlap the edge portion 81*b* of the first opening 81. Consequently, in the vicinity of the edge portion 81*b*, the first proximal end arm 51*b* is not strongly pressed against the load beam 21. Especially, in this embodiment, the first proximal end arm 51*b* is not in contact with the load beam 21 in the vicinity of the edge portion 81*b*. In other words, between the edge portion 81*b* and the first proximal end arm 51*b*, a gap G is formed along the thickness direction Z.

On the other hand, in the proximal end side with respect to the first damper member 82 (a left-hand side in the figure), the first outrigger 51 is fixed to the load beam 21 in the vicinity of the first opening 81 by fixing portion 61 described above. Further, in the first opening 81, the first proximal end arm 51*b* is pushed downward in the figure by the first damper member 82. With this structure, in the vicinity of the edge portion 81*a*, the first proximal end arm 51*b* is pressed against the load beam 21.

A cross-sectional structure of the second damping portion 90 is similar to a cross-sectional structure of the first damping portion 80 shown in FIG. 9. More specifically, a gap G is formed between the edge portion 91*b* of the second opening 91 and the second proximal end arm 52*b*. On the other hand, in the vicinity of the edge portion 91*a* of the second opening 91, the second proximal end arm 52*b* is pressed against the load beam 21.

Next, the operation of the suspension 10 according to this embodiment will be described.

When the carriage 6 is pivoted by the positioning motor 7, the suspension 10 moves in the diametrical direction of the disk 4, and thus the slider 11 of the magnetic head moves to a desired track of the recording surface of the disk 4. Then, when voltage is applied to the microactuator elements 65 and 66, the microactuator elements 65 and 66 are warped according to the voltage, and thus the when the load beam 21 can be moved by a small amount in the swaying direction S shown in FIG. 3.

The suspension 10 of this embodiment comprises the damping portions 80 and 90 in the vicinities (proximal ends) of the proximal end portions 51*a* and 52*a* of the pair of outriggers 51 and 52, respectively. When energy to vibrate the flexure 22 is applied from outside, each of the viscoelastic material layers 82*a* and 92*a* of the damper members 82 and 92 of the damping portions 80 and 90 deforms to produce internal resistance by the friction of molecules constituting the viscoelastic material layers 82*a* and 92*a*. Therefore, the vibration energy is converted into thermal energy, thereby making it possible to suppress shaking of the flexure 22.

Figure 10:
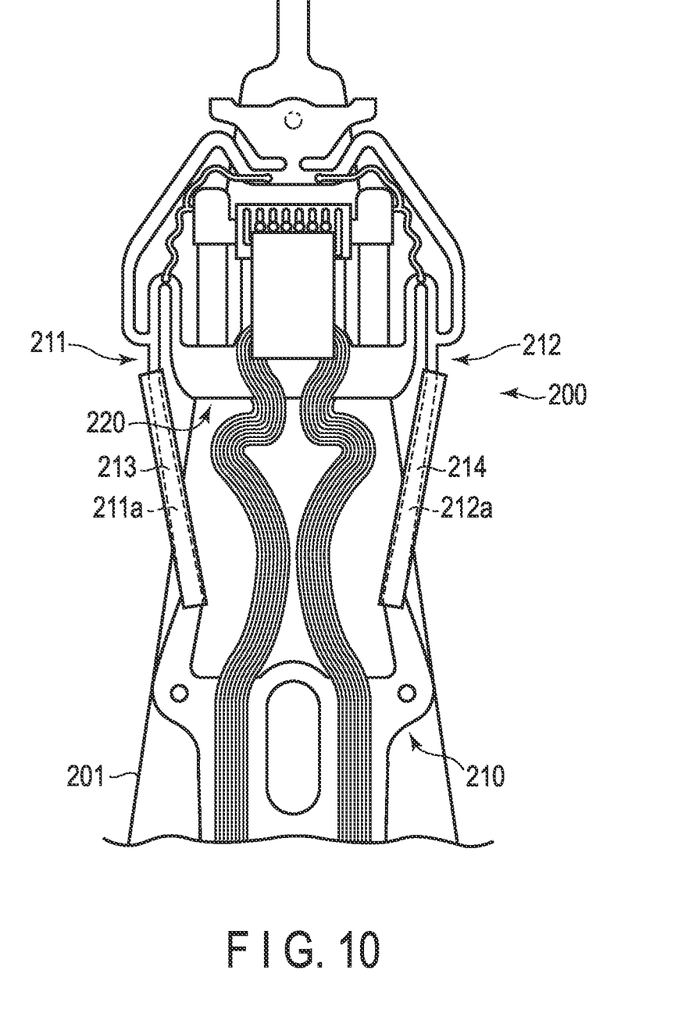
FIG. 10 is a schematic plan view of a suspension according to a comparative example.

Here, an advantageous effect of the suspension 10 according to this embodiment will be further described with reference to a comparative example. FIG. 10 is a schematic plan view of a suspension 200 according to the comparative example. The suspension 200 comprises a load beam 201, a flexure 210 including a first outrigger 211 and a second outrigger 212, and a gimbal portion 220 as in the case of the embodiment. The first outrigger 211 includes a first proximal end arm 211*a*, and the second outrigger 212 includes a second proximal end arm 212*a*.

Further, a first damper members 213 is provided in the first outrigger 211 and a second damper member 214 is provided in the second outrigger 212. The first damper members 213 is attached on a most part of the first proximal end arm 211*a*. The second damper members 214 is attached on a most part of the second proximal end arm 212*a*. The damper members 213 and 214 are not attached onto the load beam 201.

The suspension 200 configured as above can suppress the shaking of the gimbal portion 220. However, the rigidity of the flexure increases as compared to the case where the suspension do not includes the damper members 213 and 214 as will be explained below.

Figure 11:
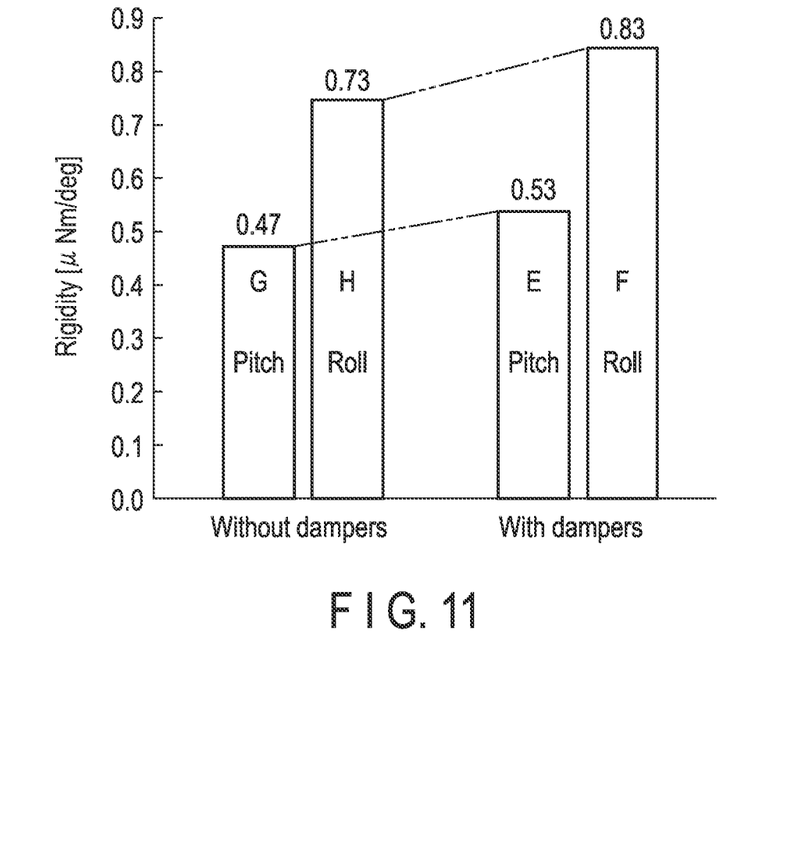
FIG. 11 is a diagram illustrating the rigidity of a flexure in each of a suspension with a damper member and a suspension without a damper member.

FIG. 11 is a graph showing the rigidity of the flexure in each of the suspension 200 including the damper members 213 and 214 as shown in FIG. 10 and a suspension which does not include damper members. Reference symbols E and F shown in FIG. 11 respectively indicate the rigidity along the pitch direction and the rigidity along the roll direction of the suspension 200 of the comparative example shown in FIG. 10. Reference symbols G and H shown in FIG. 11 respectively indicate show the rigidity along the pitch direction and the rigidity along the roll direction of the suspension which does not include the damper members 213 and 214.

As can be seen from the graph, rigidities E and F of the flexure in the suspension 200 including the damper members 213 and 214 both increased by approximately 13% as compared to the case without the damper members 213 and 214. Thus, as the rigidity increases, an adverse effect can occur in the gimbal movement in the suspension 200.

On the other hand, in the suspension 10 according to this embodiment, the openings 81 and 91 are made in the load beam 21 in the vicinities of fundamental portions of the outriggers 51 and 52, respectively, and the damper members 82 and 92 are attached onto parts of the outriggers 51 and 52, which overlap the openings 81 and 91, respectively, and the load beam 21. Thus, when the regions of the outriggers 51 and 52 on which the damper members 82 and 92 are provided is limited, the influence on the rigidity of the flexure 22 can be relaxed as compared to the configuration of the comparative example.

Further, in this embodiment, as shown in FIG. 7, the first damper member 82 is separated from the edge portion 81*b* and the second damper member 92 is separated from the edge portion 91*b*. With such a structure, the dispersion of the vibrational mode frequency of the flexure 22, which is caused by the dispersion of the positions where the damper members 82 and 92 are attached, can be inhibited as will be explained below.

Figure 12:
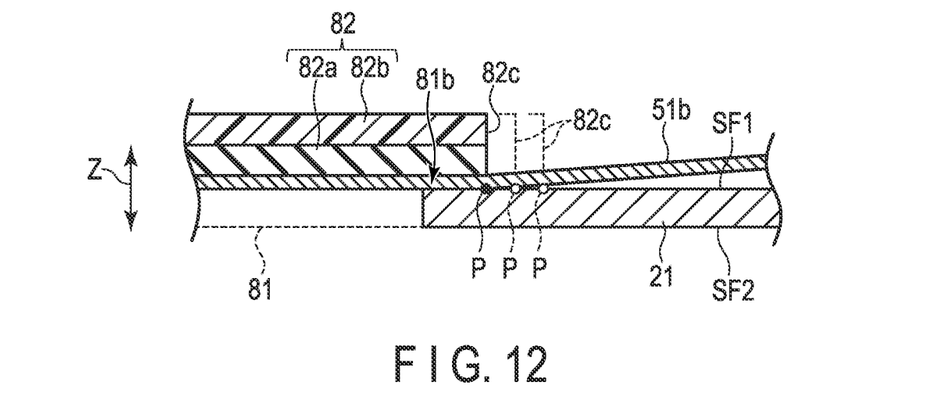
FIG. 12 is a cross-sectional view illustrating an effect of the first embodiment.

FIG. 12 is a diagram illustrating the above-described effect and shows a cross section of the state where the first damper member 82 overlaps the edge portion 81*b* of the first opening 81 along the thickness direction Z. In this case, in the vicinity of the edge portion 81b, the first proximal end arm 51b is pressed against the first surface SF1 of the load beam 21 by the first damper member 82. Reference symbol P in the figure represents a point, which will be referred to as a constraint point hereinafter, located in the most distal side (the right-hand side in the figure) of the part of the first proximal end arm 51b interposed between the load beam 21 and the first damper member 82.

If the position of the end portion 82c on the distal portion side of the first damper member 82 varies as indicated by a broken line in the production of the suspension 10, the position of the constraint point P also varies. Further, the vibrational mode frequency of the flexure 22 varies depending on the position of the constraint point P. Under these circumstances, the dispersion of the position where the first damper member 82 is attached can make the performance of the suspension 10 unstable. A similar problem may occur to the second damper member 92 as well.

On the other hand, when the first damper member 82 is spaced apart from the edge portion 81b and the second damper member 92 is spaced apart from the edge portion 91b along the longitudinal direction X as in this embodiment, the constraint point is not created in the vicinities of the edge portions 81b and 91b. Thus, the variation in vibrational mode frequency, which may be caused by the dispersion of the positions where the damper members 82 and 92 are attached, can be suppressed.

Furthermore, as described with reference to FIG. 9, if a gap G is formed between the edge portion 81b and the first proximal end arm 51b and a gap G is formed between the edge portion 91b and the second proximal end arm 52b, the vibrational mode frequency of the flexure 22 can be further stabilized.

Moreover, as shown in FIG. 7, the configuration that the damper members 82 and 92 are attached mainly onto the parts of the proximal end portion side of the arms 51b and 52b with respect to the bent portions 51e and 52e is also preferable from the viewpoint of the vibrational mode frequency and the rigidity of the flexure 22.

More specifically, if the area of the attachment of the first damper member 82 to the parts on the distal end side of the first proximal end arm 51b with respect to the first bent portion 51e is greater, the dispersion in vibrational mode frequency of the flexure 22 may occur and the rigidity of the flexure 22 may undesirably arise. On the other hand, the part of the proximal end side of the first proximal end arm 51b with respect to the first bent portion 51e is close to the fixing portion 61, which is an original constraint point, the dispersion in vibrational mode frequency and the increase in rigidity do not easily occur even if the first damper member 82 is attached. This is also the case for the relationship between the second proximal end arm 52b and the second damper member 92.

In addition to the above, various preferable advantages can be obtained from this embodiment.

Second Embodiment

The second embodiment will be explained. Unless otherwise particularly referred to, the structure and effects are similar to those of the first embodiment.

Figure 13:
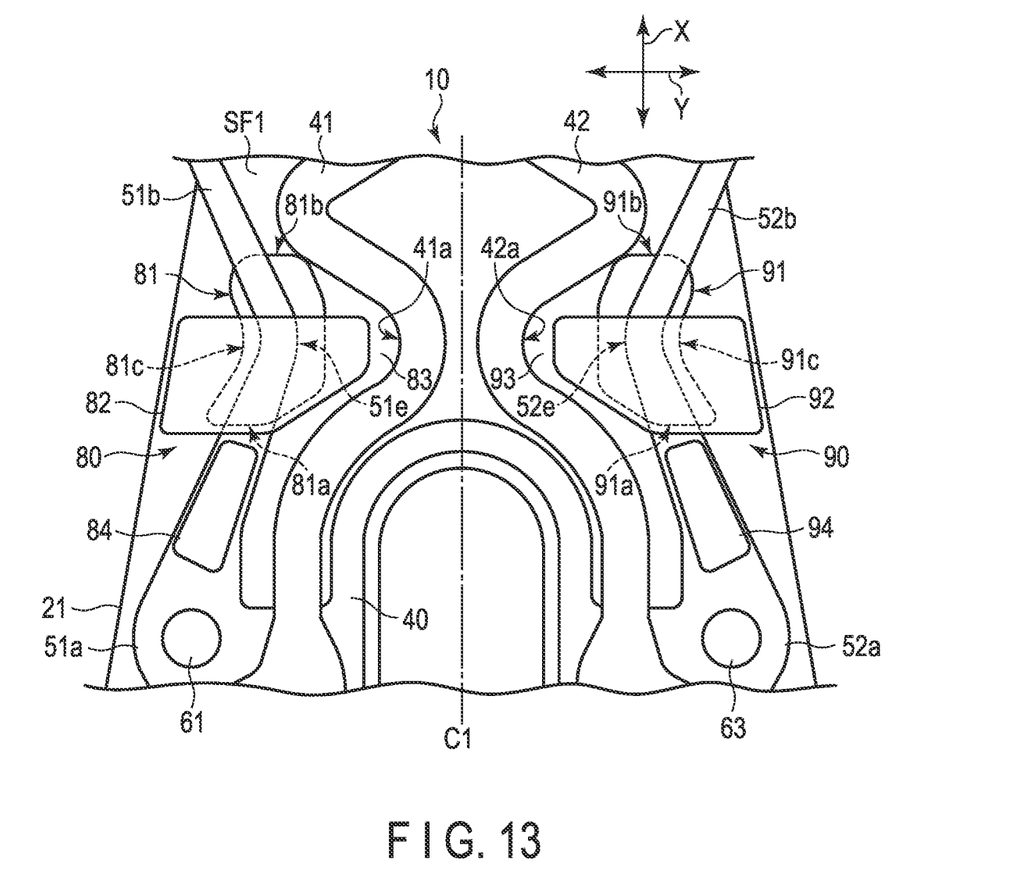
FIG. 13 is a schematic plan view of a suspension according to the second embodiment.

FIG. 13 is a schematic plan view showing a part of a suspension 10 according to the second embodiment. The suspension 10 is different from that of the example shown in FIG. 7 in the shape of the first opening 81 and the second opening 91.

That is, in the suspension 10 shown in FIG. 13, a proximal end-side edge portion 81a of the first opening 81 overlaps the first damper member 82. Further, a proximal end-side edge portion 91a of the second opening 91 overlaps the second damper member 92. On the other hand, a distal end-side edge portion 81b of the first opening 81 is spaced apart from the first damper member 82 and a distal end-side edge portion 91b of the second opening 91 is spaced apart from the second damper member 92 along the longitudinal direction X as in the example shown in FIG. 7.

In the example shown in FIG. 13, a first proximal end arm 51b is interposed between the load beam 21 and the first damper member 82 in the vicinity of the edge portion 81a. Similarly, a second proximal end arm 52b is interposed between the load beam 21 and the second damper member 92 in the vicinity of the edge portion 91a. Thus, the arms 51b and 52b are stably constrained in the vicinities of the edge portions 81a and 91a, and the dispersion in vibrational mode frequency of the flexure 22 is suppressed.

Note that the edge portions 81a and 91a are located at positions close to the fixing portions 61 and 62, respectively, which are the original constraint points of the case where there are no damper members 82 and 92. With this structure, even if the arms 51b, 52b are restrained in the vicinities of the edge portions 81a and 91a, respectively, as in the example shown in FIG. 13, the influence on the vibrational mode frequency of the flexure 22 is less.

When carrying out the invention disclosed in each of the embodiments discussed above, specific modes such as the shape of the load beam or the flexure and the arrangement of the first damping portion and the second damping portion, or specific modes of each of the elements which constitutes the suspension for a disk device can be changed in various manner. For example, one piece of damper member in which the first damper member 82 and the second damper member 92 are integrated with each other may be used. Or, a first damping portion and a second damping portion similar to those of each embodiment may be provided in a suspension which does not have microactuator elements 65 and 66.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disk device comprising:
   a load beam comprising a first opening and a second opening;
   a flexure comprising a first outrigger overlapping the first opening, at least a part of the first outrigger opposing the load beam, a second outrigger overlapping the second opening, at least a part of the second outrigger opposing the load beam, and a tongue disposed between the first outrigger and the second outrigger;
   a first damper member attached to a part of the first outrigger and the load beam, the part of the first outrigger overlapping the first opening; and
   a second damper member attached to a part of the second outrigger and the load beam, the part of the second outrigger overlapping the second opening,
   wherein:
   the first opening includes a region which is not covered by the first damper member, and the second opening includes a region which is not covered by the second damper member.

2. The suspension of claim 1, wherein:
the first opening includes a first edge portion at a distal end side of the load beam,
the second opening includes a second edge portion at the distal end side of the load beam, and
along a thickness direction of the load beam, gaps are formed respectively between the first edge portion and the first outrigger and between the second edge portion and the second outrigger.

3. The suspension of claim 1, wherein:
the first opening includes a first edge portion at a proximal end side of the load beam,
the second opening includes a second edge portion at the proximal end side of the load beam, and
the first edge portion and the first damper member are spaced apart from each other along a longitudinal direction of the load beam, and
the second edge portion and the second damper member are spaced apart from each other along the longitudinal direction.

4. The suspension of claim 3, wherein:
the first damper member overlaps the first edge portion, and
the second damper member overlaps the second edge portion.

5. The suspension of claim 3, wherein:
the first edge portion and the first outrigger are in contact with each other, and
the second edge portion and the second outrigger are in contact with each other.

6. The suspension of claim 1, wherein:
the first damper member and the second damper member are spaced apart from each other in a width direction of the load beam, and
the flexure further comprises a wiring portion passed through between the first damper member and the second damper member.

7. The suspension of claim 1, wherein:
the first outrigger includes a first bent portion overlapping the first opening,
the second outrigger includes a second bent portion overlapping the second opening,
the first damper member is attached to the first bent portion, and
the second damper member is attached to the second bent portion.

8. The suspension of claim 7, wherein:
the load beam includes a first projecting portion projecting towards the first bent portion in the first opening and a second projecting portion projecting towards the second bent portion in the second opening,
the first damper member is attached to the first projecting portion, and
the second damper member is attached to the second projecting portion.

9. The suspension of claim 7, wherein:
an area where the first damper member and the first outrigger overlap each other in a distal end side of the load beam with respect to a center of the first bent portion is less than an area where the first damper member and the first outrigger overlap each other in a proximal end side of the load beam with respect to the center of the first bent portion, and
an area where the second damper member and the second outrigger overlap each other in the distal end side with respect to a center of the second bent portion is less than an area where the second damper member and the second outrigger overlap each other in the proximal end side with respect to the center of the second bent portion.

* * * * *